United States Patent
Tran et al.

(10) Patent No.: US 9,464,740 B2
(45) Date of Patent: Oct. 11, 2016

(54) SNAP-IN ORIENTED FITTING

(71) Applicants: Richard Tran, Bothell, WA (US); Adrian Murias, Mercer Island, WA (US)

(72) Inventors: Richard Tran, Bothell, WA (US); Adrian Murias, Mercer Island, WA (US)

(73) Assignee: PACCAR Inc, Bellevue, WA (US)

( * ) Notice: Subject to any disclaimer, the term of this patent is extended or adjusted under 35 U.S.C. 154(b) by 54 days.

(21) Appl. No.: 14/030,906

(22) Filed: Sep. 18, 2013

(65) Prior Publication Data
US 2015/0076810 A1    Mar. 19, 2015

(51) Int. Cl.
*F16L 27/00* (2006.01)
*F16L 37/00* (2006.01)
*B60T 17/04* (2006.01)

(52) U.S. Cl.
CPC ............ *F16L 37/008* (2013.01); *B60T 17/043* (2013.01)

(58) Field of Classification Search
USPC ....... 403/DIG. 14; 285/139.3, 107, 211, 216, 285/921, 203, 194, 137.11, 140.1
See application file for complete search history.

(56) References Cited

U.S. PATENT DOCUMENTS

| | | | |
|---|---|---|---|
| 3,222,093 A * | 12/1965 | Simmons | 285/149.1 |
| 3,568,977 A * | 3/1971 | Nelson | 251/148 |
| 3,929,356 A | 12/1975 | DeVincent | |
| 4,288,113 A | 9/1981 | Saulnier | |
| 4,313,629 A | 2/1982 | Winterhalter | |
| 4,531,575 A * | 7/1985 | Webster | 165/78 |
| 4,603,890 A | 8/1986 | Huppee | |
| 4,635,966 A | 1/1987 | Hermann | |
| 4,640,535 A | 2/1987 | Hermann | |
| 4,773,474 A * | 9/1988 | Stay | 165/76 |
| 4,887,849 A * | 12/1989 | Briet | 285/91 |
| 5,395,139 A * | 3/1995 | Morrisson | 285/5 |

(Continued)

FOREIGN PATENT DOCUMENTS

FR    2756355 A1    5/1998

OTHER PUBLICATIONS

International Search Report and Written Opinion mailed Dec. 4, 2014, issued in corresponding International Application No. PCT/US2014/053575, filed Aug. 29, 2014, 5 pages.

*Primary Examiner* — Aaron Dunwoody
(74) *Attorney, Agent, or Firm* — Christensen O'Connor Johnson Kindness PLLC

(57) ABSTRACT

A connector system includes a plug portion and a receiving portion. The plug portion includes a resilient retention portion at the forward end of the plug portion, a sealing member distal from the retention portion, an orientation plate rigidly connected to the plug portion, wherein the orientation plate has a frontal profile including one or more straight edges. The receiving portion includes, a hole through the receiving portion, wherein the hole has a diameter smaller than a largest diameter of the resilient retention portion, a shoulder on one side of the receiving portion that cooperates with the retention portion to fix the axial position of the plug portion in the receiving portion, a recess on the opposite side of the receiving portion, wherein the recess has a frontal shape similar to the frontal profile of the orientation plate, wherein the orientation plate fits within the recess to fix the rotational orientation of the plug portion with respect to the receiving portion.

14 Claims, 4 Drawing Sheets

(56) References Cited

U.S. PATENT DOCUMENTS

| | | | |
|---|---|---|---|
| 5,667,257 A * | 9/1997 | Butler et al. ............... 285/212 |
| 5,730,481 A | 3/1998 | Szabo |
| 5,979,946 A | 11/1999 | Petersen |
| 6,123,111 A | 9/2000 | Nathan |
| 6,193,283 B1 | 2/2001 | Pickett, Jr. |
| 6,312,020 B1 | 11/2001 | Ketcham |
| 6,485,064 B1 | 11/2002 | Davidson |
| 6,557,788 B1 | 5/2003 | Huang |
| 7,806,187 B2 | 10/2010 | Lugo |
| 7,992,902 B2 | 8/2011 | Johnson |
| 7,993,149 B2 | 8/2011 | Arzberger |
| 8,230,573 B2 | 7/2012 | Zakrzewski |
| 8,336,919 B2 | 12/2012 | Gillet |

\* cited by examiner

SNAP-IN ORIENTED FITTING

BACKGROUND

Complex machinery such as a truck engine can require many tubing connections to be made to carry fluids throughout the various parts of the engine. Conventionally, tubing connections utilize a threaded fitting and nut connection to provide a compression seal. The compression seal can also prevent the tubing from rotating. The use of threaded fittings, however, can take a substantial amount of time, because each connection needs to be individually threaded. Furthermore, the threads are liable to be damaged or stripped if the nut is initially misaligned or if the nut is overtightened. Accordingly, alternative systems for making tubing connections more quickly would be desirable.

SUMMARY

Some embodiments include a connector system. The connector system includes a plug portion and a receiving portion. The plug portion includes a resilient retention portion at the forward end of the plug portion, a sealing member distal from the retention portion, an orientation plate rigidly connected to the plug portion. The receiving portion includes a hole through the receiving portion, wherein the hole has a diameter smaller than a largest diameter of the resilient retention portion, a shoulder on one side of the receiving portion that cooperates with the retention portion to fix the axial position of the plug portion in the receiving portion, a recess on the opposite side of the receiving portion, wherein the orientation plate fits within the recess to fix the rotational orientation of the plug portion with respect to the receiving portion.

In some embodiments of the connector system, the retention portion comprises a forward-facing ramp and a rear-facing ramp.

In some embodiments of the connector system, the forward-facing ramp has a smaller angle of inclination as compared to the rear-facing ramp.

In some embodiments of the connector system, the retention portion comprises a forward-facing ramp and a rear-facing ramp, and the retention portion is divided into a plurality of axially-extending fingers around a circumference of the plug portion.

In some embodiments of the connector system, the plug portion comprises an O-ring as the sealing member, and the O-ring is juxtaposed next to the orientation plate.

In some embodiments of the connector system, the plug portion comprises a tube, wherein the retention portion is formed from the tube, and the orientation plate is attached stationarily with respect to the tube.

In some embodiments of the connector system, the frontal profile of the orientation plate is a polygon.

In some embodiments of the connector system, the polygon has from 3 to 64 sides.

In some embodiments of the connector system, the frontal profile of the orientation plate has one or more curved surfaces.

In some embodiments of the connector system, the frontal profile of the orientation plate has a repeating shape.

In some embodiments of the connector system, the receiving portion has a second diameter larger than the hole, wherein the second diameter forms a frontal face and a radial face, and the sealing member contacts at least the radial face.

In some embodiments of the connector system, the receiving portion has a notch extending into the recess.

In some embodiments of the connector system, the plug portion is made from a metal or from a plastic.

In some embodiments of the connector system, a bead is juxtaposed next to the sealing member.

In some embodiments of the connector system, the orientation plate has a frontal profile in the shape of a hexagon.

In some embodiments of the connector system, the sealing member is press fit into a second diameter on the receiving portion, wherein the second diameter is larger than the hole diameter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Described herein is a connector system for attaching tubing, for example, to a port. A port for purposes of this application can be any opening for any fluid, for example, ports and tubing may be used to carry brake fluid throughout the braking system. The connector system relies on two portions designed to work with each other to make a fluid-tight connection that also provides a fixed orientation so as to prevent rotation. The connector system includes a plug portion on the end of tubing for example, and a mating receiving portion at the port to which the tubing is to be attached. In this application, "front," "forward," and derivatives thereof are used to denote a direction toward the left side with respect to the figures. In this application, "rear," "backwards," and derivatives thereof are used to denote a direction toward the right side with respect to the figures.

Figure 1:
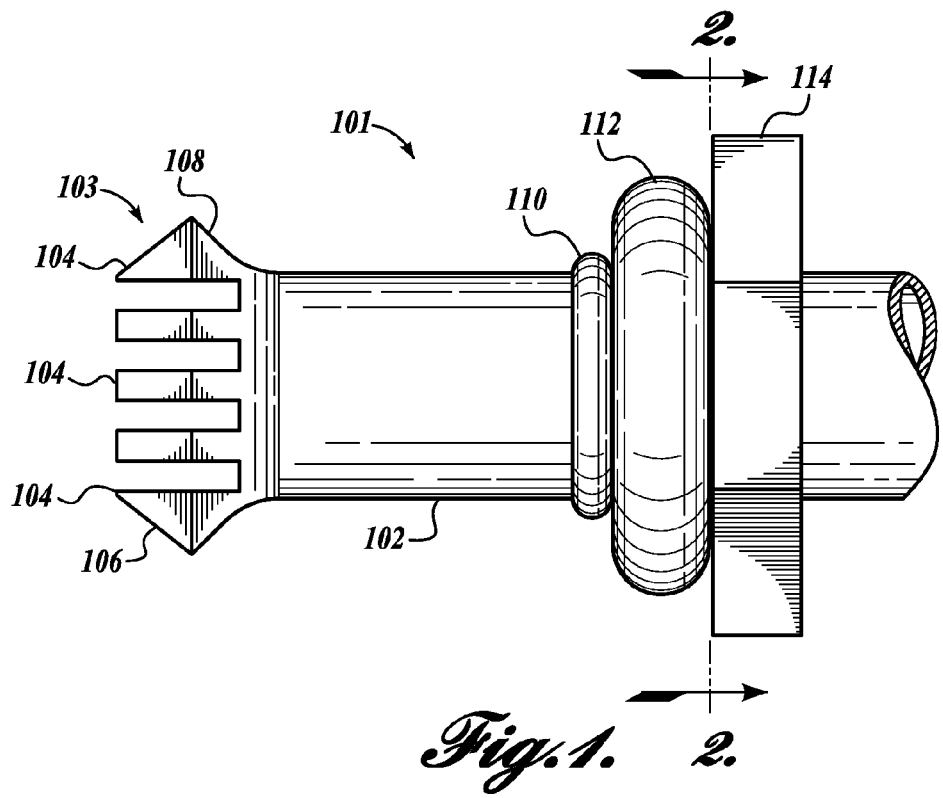
FIG. 1 is a diagrammatical illustration of a plug in a connector system.

Referring to FIG. 1, the plug portion 101 of the connector system is illustrated. The plug portion 101 may be constructed from the end of the tubing 102, or, alternatively, the plug portion 101 can be fabricated separately from the tubing 102 and thereafter attached to or otherwise affixed to the end of tubing 102. The plug portion 101 includes a straight tube or tubing 102. The tubing 102 can be made of metal or plastics, for example. The tubing 102 is of suitable inner diameter size and wall thickness for the intended application of pressure and temperature and the material of construction is selected to be compatible with the fluid being carried by the tubing 102.

The forward end of the plug portion 101 includes a retention portion 103 having a larger outer diameter than the outer diameter of the tubing 102. The retention portion 103 includes a forward-facing ramp 106 and a rear-facing ramp 108. The forward-facing ramp 106 and the rear-facing ramp converge at the apex. The forward ramp 106 and the rear ramp 108 can be rolled onto the end of metal tubing using a bead rolling process, for example. Once the forward-facing and rear-facing ramps are formed, the tubing 102 can then be cut radially into a plurality of fingers 104. Each finger 104 includes a forward-facing ramp and a rear-facing ramp. Forming individual fingers 104 that deflect at the base allows the fingers 104 to deflect in the inward radial direction, and then, return to the original position via the memory characteristics of the material. In this way, the fingers 104 will be able to deflect resiliently during the insertion process and the removal process, and then return to their original undeflected position. The forward ramp 106 is at an angle less than 90° (degrees) with respect to the longitudinal axis of the tubing 102. The rear ramp 108 can be at an angle less than 90° with respect to the longitudinal axis of the tubing 102. The angle of the forward ramp 106 and the rear ramp 108 can be adjusted so as to fine tune the required force to make either the insertion process or the removal process easier or difficult. For example, the forward ramp 106 can be set at a much smaller inclination angle in comparison to the rear ramp 108 so as to make insertion of the plug portion 101 much easier than the removal operation. However, in one embodiment, the rear ramp 108 can be at an angle of 90°. For plastics, the plug portion 101 and all its features can be injection molded, for example.

The plug portion 101 includes a bead 110 formed form the tubing 102. The bead 110 is to the rear of the retention portion 102. The bead 110 holds an O-ring 112 from moving forward on the tubing 102. The bead 110 can be an optional feature. The O-ring 112 is used to seal an interface between the plug portion 101 and surface on the port. The O-ring 112 has an outer diameter that is larger than the outer diameter of the tubing 112 and the bead 110. An orientation plate 114 is placed on the rear side of the O-ring 112, and retains the O-ring from moving backwards on the tubing 102. The orientation plate 114 can be crimped, brazed, welded, or pressed onto the tube 102 so that it positively holds the orientation of the tube 102. Alternatively, the orientation plate 114 may formed from the tube 102 material via a rolling, forming, or hydroforming process. The orientation plate 114 is rigidly or stationarily held to the tubing 102 so that there is no rotation allowed between the orientation plate 114 with respect to the tube 102, nor is there longitudinal sliding of the orientation plate 114 with respect to the tube 102.

Figure 2:
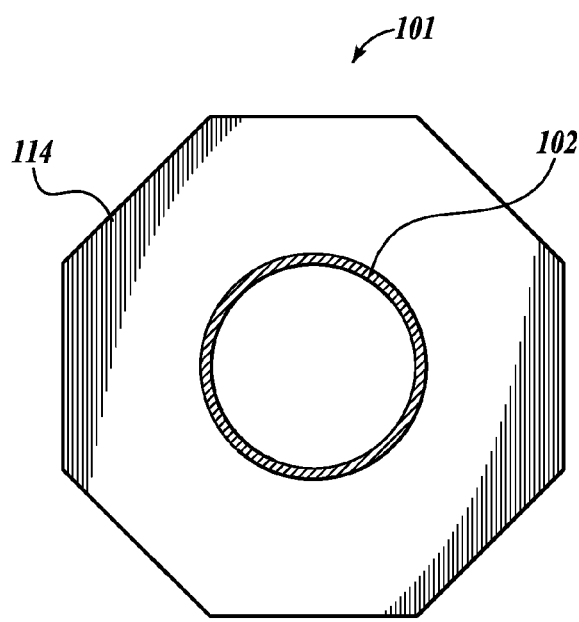
FIG. 2 is a diagrammatical illustration of the plug of FIG. 1 showing a multi-sided orientation plate.

The orientation plate 114 outer dimension is larger than the outer dimension of the O-ring 112. The frontal profile (as illustrated in FIG. 2) of the orientation plate 114 is any non-circular shape, preferably with a repeating pattern so the entire fitting can be caught into a fixed orientation. A frontal profile as used herein is the outline of a front (or rear) surface as seen on a vertical cross section oriented normal to the front (or rear) surface. The orientation plate 114 can have one or more flat sides, or alternatively one or more curved sides or shapes, or a combination of flat sides and curved shapes. The orientation plate 114 may also include internal features, such as that the orientation plate 114 can have a number of holes. The orientation plate 114 can have a repeating structure so that the tubing 102 can be selected to have a rotational orientation. That is, the tubing 102 can be fixed at a rotational angle with respect to the receiving portion at angles dictated by the orientation plate 114. For example, an eight-sided orientation plate 114, as illustrated in FIG. 2, allows orienting the tubing 102 into one of eight positions, each position differing from the next by 45 degrees of rotation. While a representative embodiment of an orientation plate is illustrated, it is to be understood that the orientation plate 114 is not limited to one having 8 equal sides, the orientation plate can be, for example, a polygon having from 3 to 64, or even more, straight edges. Alternatively, the orientation plate 114 can have other shapes, including curved shapes such as lobes. The orientation plate 114 can be a combination of straight edges with curved sections, as well.

Figure 3:
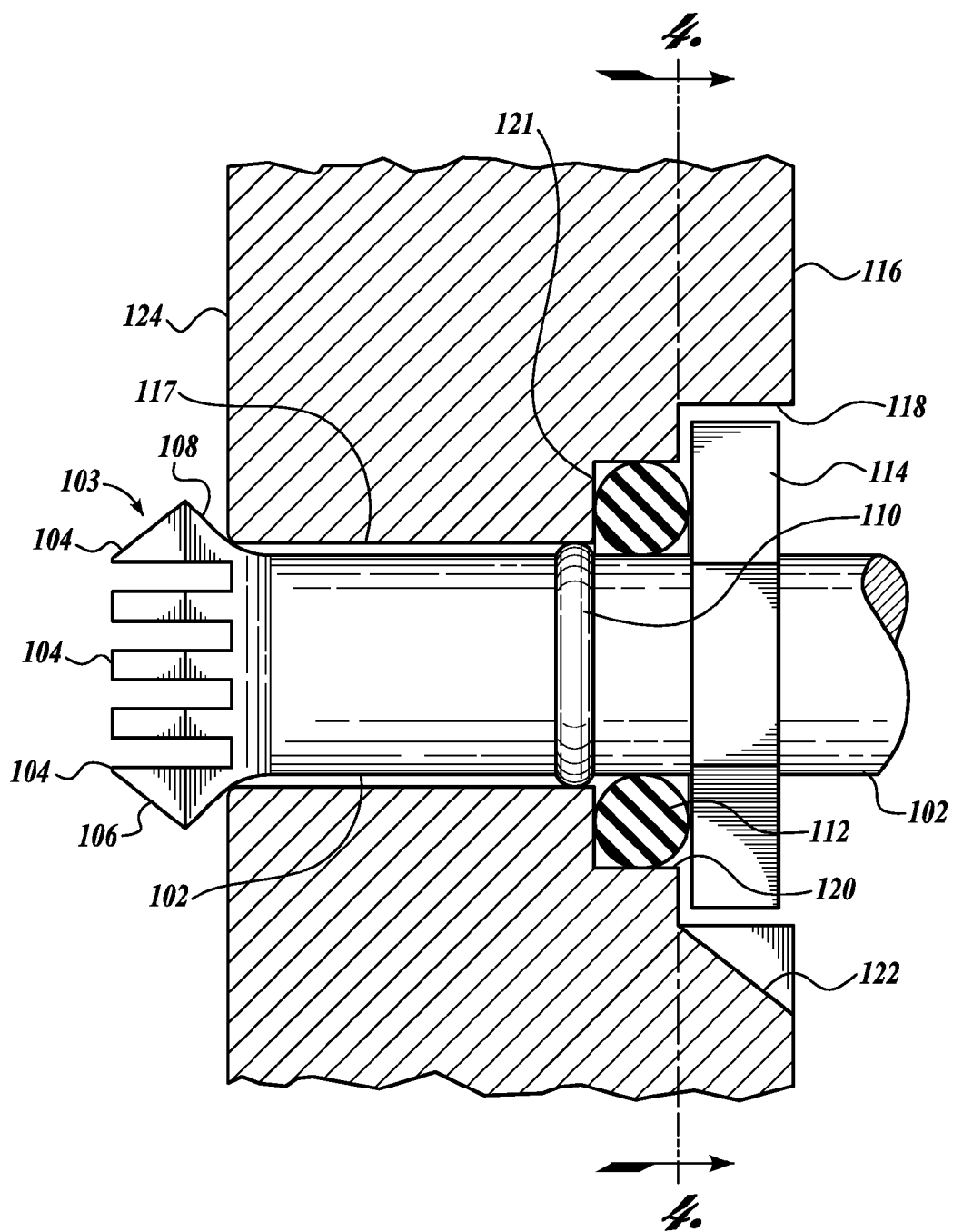
FIG. 3 is a diagrammatical cross sectional illustration of the plug portion and receiving portion of the connector system.

Referring to FIG. 3, the plug portion 102 is shown inserted into a receiving portion 116. The receiving portion 116 has a hole 117 made of a first diameter smaller than the largest diameter at the apex wherein the ramps 106 and 108 converge, but at least larger than the tube 102 outer diameter. The hole 117 is however longitudinally shorter than the tubing 102 section between the orientation plate 114 and the rear-facing ramp 108 so as to allow the rear-facing ramp 108 to engage a shoulder 124 at the forward end of the hole 117. The receiving portion 116 includes a second diameter 120 made larger than the diameter of the hole 117 to allow the O-ring 112 to fit therein. The second diameter 120 is collinear with respect to the hole 117. The step in size between the first diameter and the second diameter 120 creates a frontal wall 121. The second diameter 120 can be slightly smaller than the outer diameter of the O-ring 112 such that the O-ring 112 creates a fluid-tight seal in the radial direction against the second diameter wall 120. The receiving portion 116 includes a recessed portion 118 that is provided at the entrance to the hole 117. The recessed portion 118 is the negative shape of the orientation plate 114, and the recess 118 has a frontal profile that closely matches the frontal profile of the orientation plate 114. Depending on the shape of the orientation plate 114, the receiving portion 116 can have the positive or the negative shape to mate with the orientation plate 114. The orientation plate 114 is made to be a close tolerance fit within the recessed portion 118.

When the plug portion 101 is being inserted into the hole 117, the forward-facing ramps 104 on the fingers 104 contact the hole 117 such that the individual fingers 104 will deflect radially inward to allow passage of the plug 101 through the hole 117. When the forward-facing ramps 104 exit on the opposite end of the hole 117, the fingers 114 will spring resiliently radially outward so that the rear-facing ramp 108 will contact the edge of the opposite end of the hole 117 at the shoulder 124. The rear ramps 108 may apply an axial force forcing the tubing 102 forward. The orientation plate 114 may on the frontal face of the recess 118. The O-ring 112 can be appropriately toleranced diametrically (radially) so that the O-ring 114 can seal against the outside wall of the tube 102 and the second diameter wall 120 in the radial direction. The interference or press fit of the O-ring into the second diameter 120 should be sufficient to create a seal. To create a press fit, the diameter 120 can be slightly smaller than the outer diameter of the O-ring 112, such that the O-ring 112 will need to compress slightly to be inserted into the diameter 102. The O-ring 112 can create an outward radial force against the diameter 120 so as to create a sealing surface. The radial force also compresses the inner diameter of the O-ring 112 against the outer diameter of the tube 102 so as to create a sealing surface at this location as well. At the outermost surface of the receiving portion 116, the recessed portion 118 will receive the orientation plate 114. The orientation plate 114 will be inserted into the recess 118 to prevent rotation after insertion. The orientation plate 114 placement into the recess 118 is neither an interference fit nor press fit, but there is simply a close fit tolerance to allow placement, and, once placed in the recess 114, the orientation plate 114 resists rotation. Because the orientation plate 114 is provided with a repeating pattern at the outer perimeter, the orientation plate 114 can be angularly oriented in a plurality of present angles. The number of orientations is dictated by the number of straight edges making up the perimeter, for example.

Figure 4:
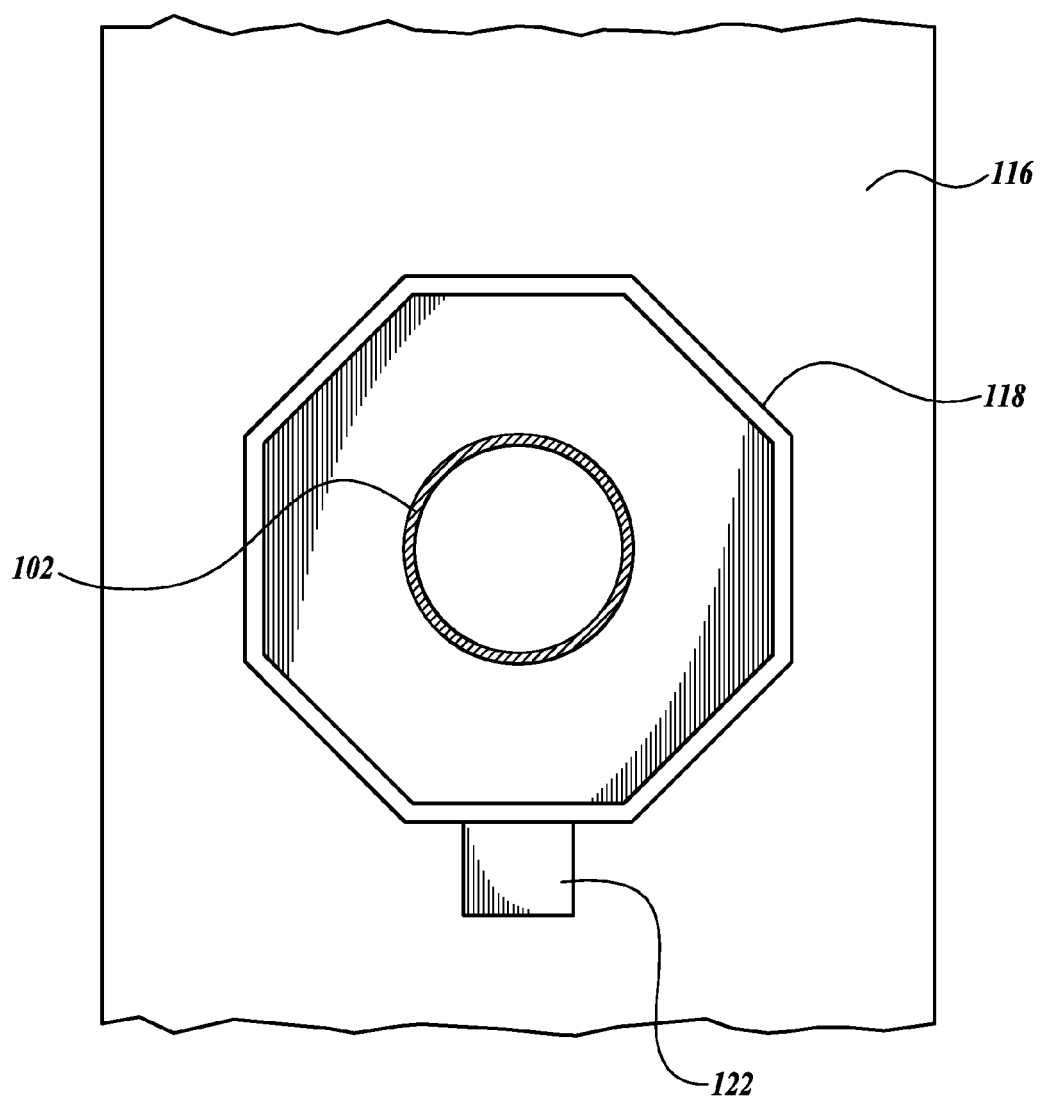
FIG. 4 is a diagrammatical illustration of the connector system of FIG. 3 showing a multi-sided orientation plate.
Figure 5:
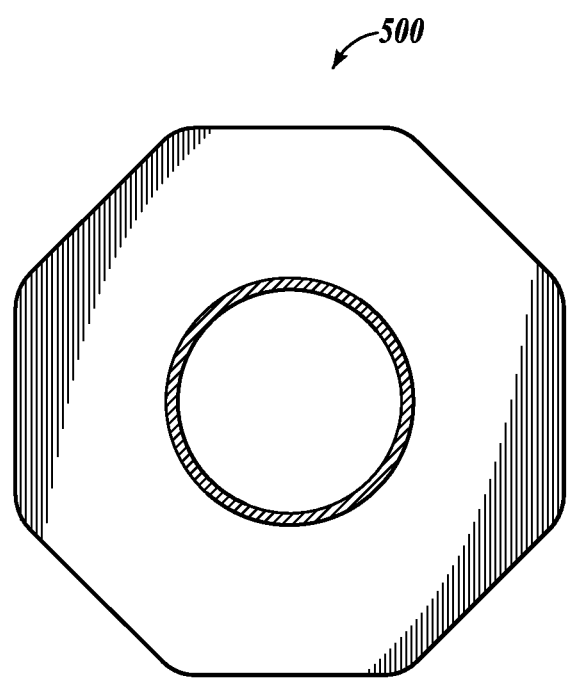
FIG. 5 is a diagrammatical illustration of a multi-sided orientation plate 500.

Preferably, the insertion force of the plug portion 101 will be lower than the removal force. In some embodiments, as shown in FIG. 4, there will be a notch 122 to allow a tool to be inserted under the orientation plate 114 so that the plug portion 101 can be pried out of the receiving portion 116. Since the O-ring 112 is sealing in the radial direction, and the retention portion 103 is holding the plug portion 101 in the axial direction, the retention force created by the retention portion 103 is not associated with the quality of the seal so the potential of leaking is not dependent on installation.

Some embodiments include a connector system. The connector system includes a plug portion and a receiving portion. The plug portion includes a resilient retention portion at the forward end of the plug portion, a sealing member distal from the retention portion, an orientation plate rigidly connected to the plug portion. The receiving portion includes a hole through the receiving portion, wherein the hole has a diameter smaller than a largest diameter of the resilient retention portion, a shoulder on one side of the receiving portion that cooperates with the retention portion to fix the axial position of the plug portion in the receiving portion, a recess on the opposite side of the receiving portion, wherein the orientation plate fits within the recess to fix the rotational orientation of the plug portion with respect to the receiving portion.

In some embodiments of the connector system, the retention portion comprises a forward-facing ramp and a rear-facing ramp.

In some embodiments of the connector system, the forward-facing ramp has a smaller angle of inclination as compared to the rear-facing ramp.

In some embodiments of the connector system, the retention portion comprises a forward-facing ramp and a rear-facing ramp, and the retention portion is divided into a plurality of axially-extending fingers around a circumference of the plug portion.

In some embodiments of the connector system, the plug portion comprises an O-ring as the sealing member, and the O-ring is juxtaposed next to the orientation plate.

In some embodiments of the connector system, the plug portion comprises a tube, wherein the retention portion is formed from the tube, and the orientation plate is attached stationarily with respect to the tube.

In some embodiments of the connector system, the frontal profile of the orientation plate is a polygon.

In some embodiments of the connector system, the polygon has from 3 to 64 sides.

In some embodiments of the connector system, the frontal profile of the orientation plate has one or more curved surfaces.

In some embodiments of the connector system, the frontal profile of the orientation plate has a repeating shape.

In some embodiments of the connector system, the receiving portion has a second diameter larger than the hole, wherein the second diameter forms a frontal face and a radial face, and the sealing member contacts at least the radial face.

In some embodiments of the connector system, the receiving portion has a notch extending into the recess.

In some embodiments of the connector system, the plug portion is made from a metal or from a plastic.

In some embodiments of the connector system, a bead is juxtaposed next to the sealing member.

In some embodiments of the connector system, the orientation plate has a frontal profile in the shape of a hexagon.

In some embodiments of the connector system, the sealing member is press fit into a second diameter on the receiving portion, wherein the second diameter is larger than the hole diameter.

Each of the above individual features can be combined with one, more than one, or all other features to in further alternate embodiments.

While illustrative embodiments have been illustrated and described, it will be appreciated that various changes can be made therein without departing from the spirit and scope of the invention.

The embodiments of the invention in which an exclusive property or privilege is claimed are defined as follows:

1. A connector system, comprising:
   a plug portion comprising:
   a tube with a resilient retention portion at the forward end of the tube, wherein the retention portion includes a forward-facing ramp and a rear-facing ramp, wherein the rear-facing ramp makes an angle less than 90° with respect to a longitudinal axis of the tube;
   a sealing member distal from the retention portion;
   an orientation plate rigidly connected to the tube, wherein the orientation plate is held stationary to prevent rotation between the orientation plate and the tube; and
   a receiving portion comprising:
   a hole through the receiving portion, wherein the hole has a diameter smaller than a largest diameter of the resilient retention portion;
   a shoulder on one side of the receiving portion that cooperates with the retention portion to fix the axial position of the plug portion in the receiving portion; and
   a recess on the opposite side of the receiving portion, wherein the orientation plate fits within the recess to fix the rotational orientation of the plug portion with respect to the receiving portion.

2. The connector system of claim 1, wherein the forward-facing ramp has a smaller angle of inclination as compared to the rear-facing ramp.

3. The connector system of claim 1, wherein the retention portion is divided into a plurality of axially-extending fingers around a circumference of the plug portion.

4. The connector system of claim 1, wherein the plug portion comprises an O-ring as the sealing member, and the O-ring is juxtaposed next to the orientation plate.

5. The connector system of claim 1, wherein a frontal profile of the orientation plate is a polygon.

6. The connector system of claim 5, wherein the polygon has from 3 to 64 sides.

7. The connector system of claim 1, wherein a frontal profile of the orientation plate has one or more curved surfaces.

8. The connector system of claim 1, wherein a frontal profile of the orientation plate has a repeating shape.

9. The connector system of claim 1, wherein the receiving portion has a second diameter larger than the hole, wherein the second diameter forms a frontal face and a radial face, and the sealing member contacts at least the radial face.

10. The connector system of claim 1, wherein the receiving portion has a notch extending into the recess.

11. The connector system of claim 1, wherein the plug portion is made from a metal or from a plastic.

12. The connector system of claim 1, further comprising a bead juxtaposed next to the sealing member.

13. The connector system of claim 1, wherein the orientation plate has a frontal profile in the shape of a hexagon.

14. The connector system of claim 1, wherein the sealing member is press fit into a second diameter on the receiving portion, wherein the second diameter is larger than the hole diameter.

* * * * *